(12) United States Patent
Khan

(10) Patent No.: US 7,068,642 B1
(45) Date of Patent: *Jun. 27, 2006

(54) SYSTEM AND METHOD OF PROPAGATING EXCLUSION RECORDS IN A NETWORKED COMPUTER TELEPHONY INTEGRATION SYSTEM

(75) Inventor: Saima Khan, Chelmsford, MA (US)

(73) Assignee: Concerto Software, Inc., Westford, MA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/398,222

(22) Filed: Sep. 17, 1999

(51) Int. Cl.
*H04L 12/66* (2006.01)

(52) U.S. Cl. .................................. 370/352; 379/265.09

(58) Field of Classification Search ................ 370/400, 370/401, 402, 259, 261, 263, 352, 353, 854, 370/355, 336, 351; 379/265.01, 265.02, 379/265.1, 266.09, 266.07, 266.1, 350, 355.01, 379/265.09, 266.08, 88.11, 265.05
See application file for complete search history.

(56) References Cited

U.S. PATENT DOCUMENTS

| | | | | |
|---|---|---|---|---|
| 5,343,518 A * | 8/1994 | Kneipp | ........................ | 379/355 |
| 5,592,543 A * | 1/1997 | Smith | ........................ | 379/265 |
| 5,796,791 A * | 8/1998 | Polcyn | ........................ | 379/265 |
| 5,832,068 A * | 11/1998 | Smith | ........................ | 379/113 |
| 5,991,395 A * | 11/1999 | Miloslavsky | ............. | 379/265.02 |
| 6,141,412 A * | 10/2000 | Smith | ........................ | 379/265 |
| 6,175,564 B1 * | 1/2001 | Miloslavsky et al. | ....... | 370/352 |
| 6,345,094 B1 * | 2/2002 | Khan | ........................ | 379/266.07 |
| 6,411,708 B1 * | 6/2002 | Khan | ........................ | 379/266.07 |
| 6,456,615 B1 * | 9/2002 | Kikinis | ........................ | 370/352 |
| 6,480,601 B1 * | 11/2002 | McLaughlin | ............ | 379/265.11 |
| 6,587,557 B1 * | 7/2003 | Smith | ........................ | 379/265.01 |
| 6,614,903 B1 * | 9/2003 | Flockhart et al. | ...... | 379/265.12 |
| 6,661,889 B1 * | 12/2003 | Flockhart et al. | ...... | 379/265.05 |
| 6,731,626 B1 * | 5/2004 | Neyman | ...................... | 370/352 |
| 6,744,877 B1 * | 6/2004 | Edwards | ................. | 379/265.02 |
| 6,785,370 B1 * | 8/2004 | Glowny et al. | .......... | 379/88.22 |
| 6,804,346 B1 * | 10/2004 | Mewhinney | .............. | 379/265.1 |
| 6,850,603 B1 * | 2/2005 | Eberle et al. | ............. | 379/88.16 |
| 6,879,674 B1 * | 4/2005 | Strandberg | ............. | 379/210.01 |
| 6,928,155 B1 * | 8/2005 | Knitl et al. | ............ | 379/265.01 |

\* cited by examiner

*Primary Examiner*—Hassan Kizou
*Assistant Examiner*—Ricardo Pizarro
(74) *Attorney, Agent, or Firm*—Bourque & Associates, P.A.

(57) ABSTRACT

A system and method of propagating exclusion records between a plurality of networked call centers is provided. Each call center includes a CTI system having a dynamic data record exclusion system. The system includes an exclusion record exporter and an exclusion record importer interfacing the dynamic data record exclusion system at each networked CTI system, which export and import exclusion records that are generated at one CTI system to the remaining networked CTI systems. The method begins by maintaining at least one exclusion table including at least one exclusion record in a first call center's dynamic data record exclusion system. Then, the exclusion records, along with a list of the networked call centers to which the exclusion records should be sent, are sent to an exclusion record exporter, where they are saved in a transfer file. The exclusion record exporter then transfers each transfer file to a defined directory at an exclusion record importer at at least one other networked call center. Each exclusion record importer searches its defined directory and, if a new transfer file is identified, copies the exclusion records to an appropriate exclusion table in that call center's dynamic data record exclusion system.

14 Claims, 4 Drawing Sheets

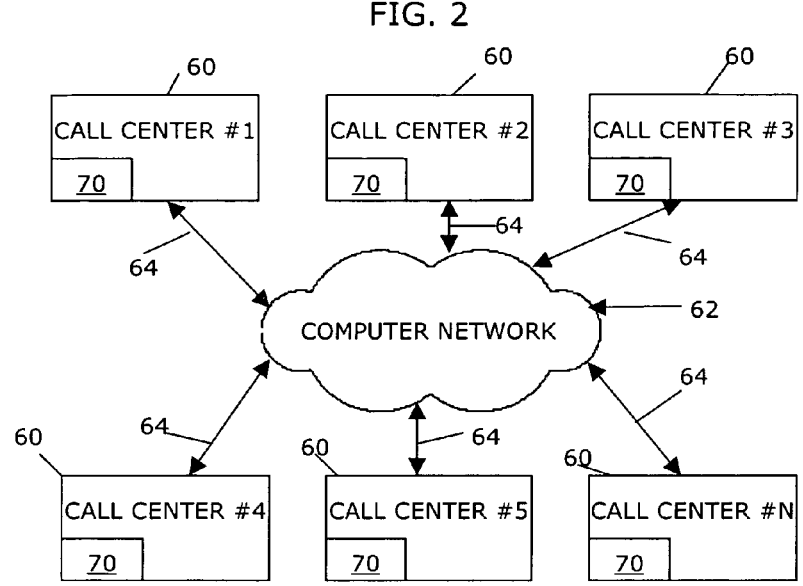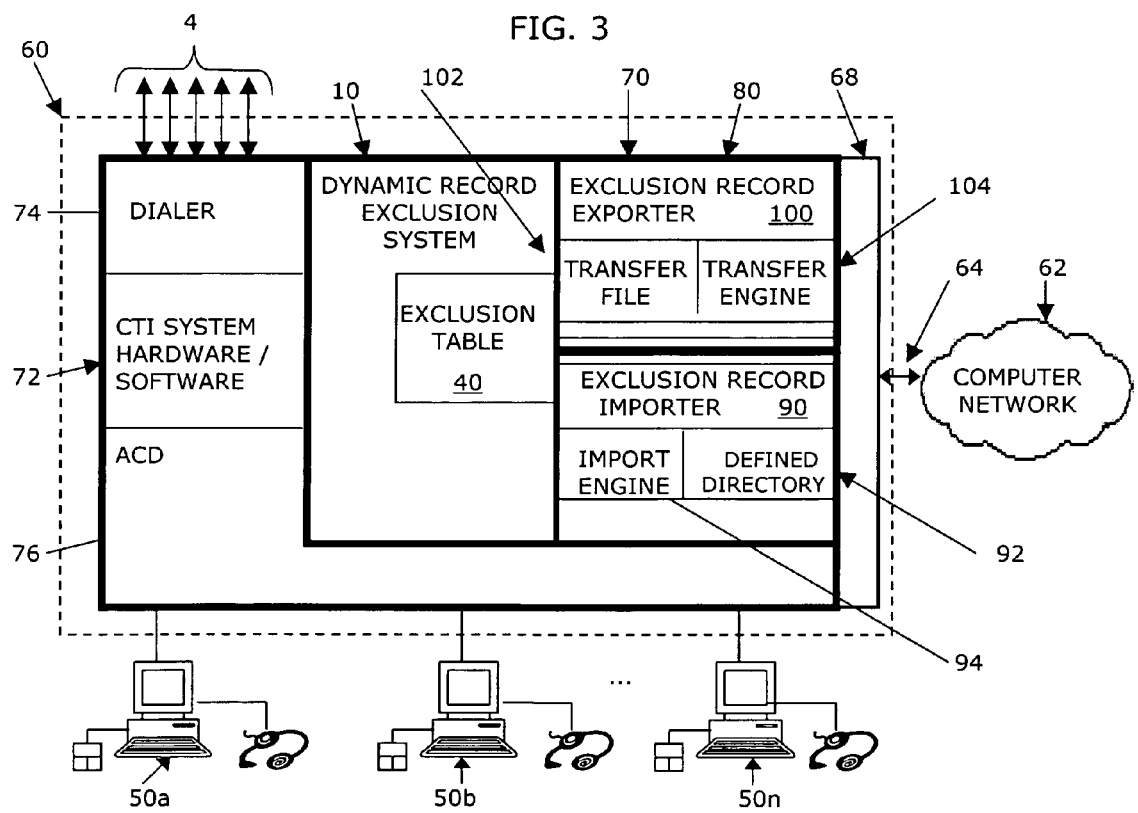

200

Maintain at least one exclusion table in a first networked call center dynamic data record exclusion system, said at least one exclusion table for holding at least one exclusion record.
210

Send said at least one exclusion table including said at least one exclusion record and a list of distributed call center CTI systems to which said at least one exclusion table should be exported to an exclusion record exporter.
220

Save said at least one exclusion table including at least one exclusion record to be exported in a transfer file.
230

Transfer said transfer file to a defined directory at said at least one distributed call center CTI system.
240

Search, using an exclusion record importer, said defined directory to identify if at least one new file has been transferred to said defined directory.
250

Copy said at least one exclusion table including at least one exclusion record stored in an identified new transfer file to an appropriate exclusion table maintained in said distributed call center CTI system's dynamic data record exclusion system.
260

FIG. 6

SYSTEM AND METHOD OF PROPAGATING EXCLUSION RECORDS IN A NETWORKED COMPUTER TELEPHONY INTEGRATION SYSTEM

FIELD OF THE INVENTION

This invention relates to automated telephone call processing systems and more particularly, to a system and method of propagating exclusion records throughout a plurality of networked, distributed computer telephony integration (CTI) systems so that each system can update a call list that is being utilized in an outgoing telephone call campaign.

BACKGROUND OF THE INVENTION

Computer automation has found its way into every facet of data processing including telephone call processing systems. For example, since the 1980's, telephone call centers have employed automated systems to increase call center efficiency. Such automated systems include automated call placement systems and automatic call distribution (ACD) systems, which were developed to handle inbound and outbound calls more efficiently and to replace banks of multi-button telephony sets and randomly-handled calls. As call volumes increased, voice response units (VRU) were developed to enable customers using touch-tone telephones to directly interact a call center's host computer.

Predictive dialers were developed to automate outbound calling functions. Predictive dialers increased productivity by more than three hundred percent over manual dialing operations by automatically screening out all "no answers", busy signals, and answering machines, and only presented call center agents with live voices.

Accordingly, it is now common for organizations who must make and handle large numbers of telephone calls with their customers, such as banks, credit card handling companies and telemarketers, to utilize computerized telephony systems which receive lists of calls to be placed containing customer account information including a telephone number, and which organize, prioritize and control the calling of each customer account in the list.

Although such existing telephony systems vary extensively, most systems are capable of receiving call records, organizing them into groups or lists, often prioritizing or ordering the call records within the groups, and providing the call records to a telephone dialing mechanism to be called and subsequently connected to an agent who will handle the call. Along with the prior arts systems, however, come several drawbacks. The first drawback relates to the fact that once a call group or list has been established, many systems are incapable of "adding" to the group dynamically, based on some recent event. In addition, most systems are also not capable of dynamically altering the priority of any given call record within a group once it has been downloaded or prepared for download to the telephone call record processing system. Such a feature is often an important consideration for certain telephone related applications.

For example, credit card processing organizations are becoming increasingly aware of the marked rise in fraudulent use of credit cards. Since in many occasions any financial losses from fraudulent use of credit cards may rest on the credit card issuer, the issuer has a significant vested interest in and a strong desire to detect fraudulent use of credit cards and most importantly would like to detect even the potential fraudulent use of a credit card as early as possible, in order to minimize losses.

Accordingly, the credit card processing industry has developed a series of "tests" which are applied to credit card usage in an effort to attempt to determine whether a particular credit card is potentially being used fraudulently. For example, one such test includes monitoring the period of time between the date of last use of a credit card and multiple current uses of a credit card. Statistics have shown that if a credit card is not used for an extended period of time and all of a sudden the card is used extensively in a short period of time, chances are that the card has been stolen and is being used fraudulently.

Another test or indicator is the amount or value of the charged transaction. Credit card processors can establish profiles of credit cards users including the average charge amount over a period of time and, if a charge amount is received which exceeds this average amount, a potential exists for fraudulent credit card usage.

In certain circumstances, some credit card processors even assign a numerical "score" value to a customer's account which "score" reflects the relative potential for the existence of fraudulent use of the credit card. As an example, a "score" value of "1" (one) may indicate only a small potential or likelihood for fraudulent usage while a "score" of "10" (ten) in association with a customer's account may indicate a very high probability of fraudulent usage.

In the past, credit card processing organizations have been able to provide groups of customer account records which have been identified as having a potential for fraudulent usage, and have been able to assign such groups to an automated telephone call record processing system for dialing at a later time. Given the real-time access to credit card activity which credit card processors now have, it is therefore often possible to spot potential credit card fraud in a short period of time. Therefore, a customer account which has received a low score in terms of probability of fraud during a call record download based on a prior day credit card activities may receive a very high score for probability of fraudulent credit card usage during the present day as credit card transactions are received by the credit card processor.

Given the present limitations in call record processing systems, however, is not possible, in real time, to update an existing customer account call record "score" in a previously downloaded call record list or group to indicate that the relative probability of fraudulent credit card usage has "jumped" from a lower value to a higher value, and to therefore to schedule the call the customer immediately or at least sooner than previously scheduled to verify whether or not the card has been stolen.

In the case of many prior art systems, this information will not be downloaded to the call record processing system until the next day, when it may be too late to determine that a credit card has been lost or stolen and to prevent further usage. Similarly, credit card processing activities may, during the middle of the day, indicate potential fraudulent use of a credit card and in this situation, it would also be desirable to immediately add this call record to the list of call records to be processed for that day so that the customer may be immediately called. Additionally, the owner of the card may telephone in to report the loss of the credit card and therefore, it is not necessary to telephone him or her. This customer's name may therefore be immediately removed from the call list.

Accordingly, systems and methods have been developed, such as the one disclosed in the Applicant's U.S. Pat. No. 5,832,068, which is fully incorporated herein by reference, that provide a data processing system with real time data record updating and dynamic data record exclusion. The dynamic data record excluder of '068 patent includes a unique data record identifier generator, responsive to at least one received data record, for generating a unique data record identifier. A data record index stores at least a portion of the received data record and the generated unique data record identifier. Unique data record identifiers may be based on one or more of various data record processing elements such as time, date, time of record download, customer account number, download cycle, or data record batch number.

In addition, where the processing system maintains a single "version" or location in which all data records are stored, the received data records may be compared against previously received data records to determine whether or not the same or previous version of the received data record was previously received, in which case the previous version is excluded and the new version is retained to be processed presently or at a later time.

Such a dynamic data record excluder determines whether the received data record was previously received by comparing at least a portion of the received data record with data stored in the data record index. If a data record referencing the same account number was previously received, the previously received data record is discarded, marked "to be excluded" and/or a data record exclusion indicator is generated, and only the newest record will be processed. A data record exclusion list is maintained in response to the dynamic data record excluder, for storing the generated data record exclusion indicators or the list of data records to be excluded from processing.

However, the widespread use of computer networks has added another layer of complexity to record exclusion systems. Today, may companies and organizations utilize more that one call center, each having its own computer telephony integration (CTI) system for placing and receiving calls. While distributing call center operations does provide certain advantages to a company, it also provides a significant disadvantage with respect to call record exclusion namely, an exclusion record generated by one CTI system is not shared with the other distributed call center CTI systems. Accordingly if a customer places an inbound call, which is handled by a first call center and which results in the generation of an exclusion record by that call center's CTI system, the customer may still be called if the customer is the subject of a call record slated for dialing by a dialer included in a CTI system at another of the distributed call centers. Therefore, the customer may still be called. This will result in unnecessary telephone line costs and will reduce call center productivity.

Accordingly, what is needed is a system and method of propagating exclusion or priority records between a plurality of distributed, networked CTI systems so that an exclusion record or a priority call record generated by one of the CTI systems is provided to the remaining networked, distributed call centers. In this manner, a generated exclusion record or priority call record will be more likely to result in the exclusion or prioritization of a specified call record by all of the networked call centers.

SUMMARY OF THE INVENTION

A system for propagating at least one exclusion record maintained in an exclusion table by a computer telephony integration (CTI) system at a first call center among a plurality of networked distributed call centers is provided. Each of the first call center and the distributed call center include a computer telephony integration (CTI) system including a dynamic record excluding system having an exclusion table. The first call center and the distributed call centers are linked over a computer network. The exclusion record propagation system includes an exclusion record exporter and an exclusion record importer running on each said CTI system. Each exclusion record exporter prepares and sends transfer files, including exclusion records to be distributed to the networked distributed call centers, to defined directories at each desired destination CTI system.

Each exclusion record importer is configured to search its defined directory at periodic intervals to identify new transfer files and to copy the exclusion record included in the transfer files to the appropriate exclusion table in its dynamic data record exclusion system.

A method of propagating at least one exclusion record maintained in an exclusion table by a computer telephony integration (CTI) system having a dynamic record excluder system at a first call center among a plurality of distributed call centers, wherein each distributed call center includes a computer telephony integration (CTI) system having a dynamic record excluder system including an exclusion table and wherein each distributed call cetner is linked to said first call center over a computer network, is also provided. The method begins by maintaining at least one exclusion table in the first call center's dynamic record excluder system. Each exclusion table is configured to hold at least one exclusion record. Then, at specified intervals, the exclusion table(s), including one or more exclusion records, and a list of distributed call center CTI systems to which the exclusion table(s) should be exported are sent to an exclusion record exporter. At the exclusion record exporter, the received exclusion table(s) are saved in a transfer file. The transfer file is then sent to at least one of the distributed call center CTI systems, where it is saved in a defined directory.

Each distributed call center CTI system then searches its defined directory to identify new files added to the directory. If a new file is identified, then the exclusion records stored in the transfer file are copied to an appropriate exclusion table maintained in said distributed call center CTI system's dynamic data record excluder system.

DESCRIPTION OF THE DRAWINGS

These and other features and advantages of the present invention will be better understood by reading the following detailed description, taken together with the drawings wherein:

FIG. 2 is a block diagram showing a plurality of networked distributed call centers;

FIG. 3 is a block diagram of one networked distributed call center system including a dynamic data record excluder system according to the prior art and an exclusion record propagation system according to the teachings of the present invention;

FIG. 6 is a flow chart showing a method of propagating exclusion records among a plurality of networked call centers according to the teachings of the present invention.

DETAILED DESCRIPTION OF THE PREFERRED EMBODIMENT

Turning now to the figures, a system and method of propagating exclusion records throughout a plurality of networked, distributed computer telephony integration (CTI) systems is disclosed. The disclosed exclusion record propagation system and method works in conjunction with a plurality of network CTI systems, each having a dynamic record excluder system, such as the one disclosed in commonly owned U.S. Pat. No. 5,832,068.

Figure 1:
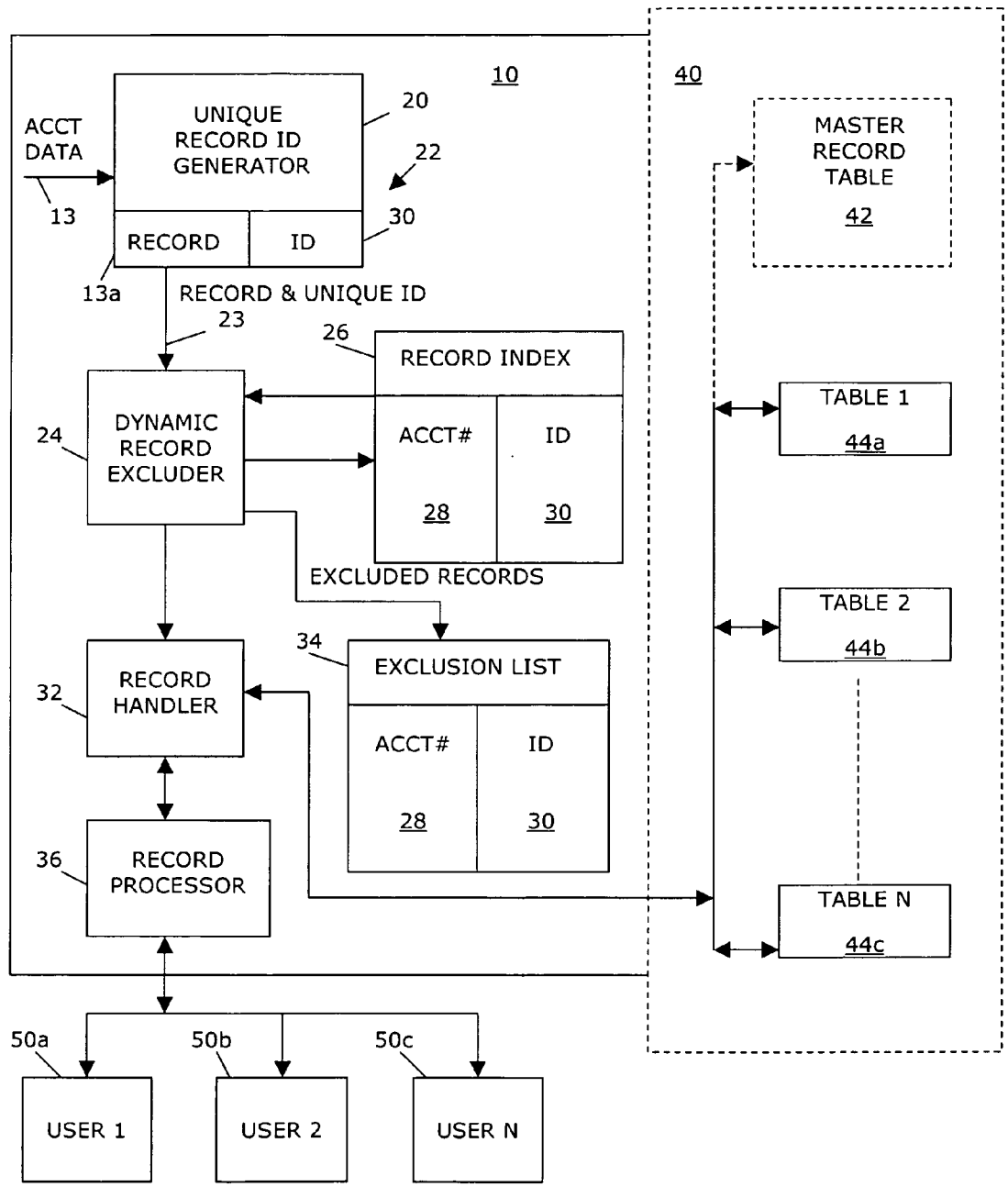
FIG. 1 is a block diagram of a prior art dynamic record excluder system.

FIG. 1 shows a dynamic record excluder system 10 according to the teachings of the '068 patent. The dynamic record excluder system 10 includes one or more locations in which data records may be stored. In such a system, it is not generally practical to scan each and every data record storage location for previously received data records for the same "account" or "matter" and therefore, a data record exclusion list will be generated and checked before any previously received and stored record is processed.

The dynamic data record exclusion system 10 includes a unique record identification generator 20 which receives data records 13 from a data record source and assigns a unique record identification 30 to each data record. The unique data record identification generator 20 utilizes a portion of the received data record such as account number, telephone number or other indicia which serves to uniquely identify a party, account, data record etc., about which the data record refers. In addition to the unique account information, the unique record identification generator 20 may append additional information to generate the unique data record identifier 22. The unique data record identifier is appended to and/or included with the received data record 13a as shown generally by 22, and provided to the dynamic data record excluder 24 over path 23.

Upon receipt of the data record with embedded or appended unique data record identifier 22, the dynamic data record excluder 24 scans data record index 26 utilizing one or more portions of the unique data record identifier 22, such as the account number portion 28, previously generated to determine if a previous "version" of a data record for the same "account" was received prior to receipt of the current record. If no match is found, the dynamic record excluder 24 will store both the account number portion 28, and the identification portion 30 of the unique data record identifier in the data record index 26 for later reference and searching.

If the dynamic data record excluder 24 discovers a matching account number 28 or similar unique data record identification key portion in the data record index 26, the dynamic data record excluder 24 will retrieve the identification portion 30 of the unique data record key stored in data record index 26 and store both the account number 28 and the appended or separate identification portion 30 in the record exclusion list 34.

If the dynamic record excluder 24 determines that there is no data record to exclude, the data record with appended unique identifier is transferred to a data record handler 32 which stores the data record and appended unique record identifier in one or more data record tables 40. The data record tables 40 may include one master data record table 42 or more preferably, a plurality of data record tables 44a–44c. This arrangement facilitates telephone call record processing as is more fully disclosed in U.S. Pat. No. 5,495,523 assigned to the assignee of the present invention and incorporated herein by reference.

If the dynamic record excluder 24 determines upon examining or scanning the data record index 26 that there is a previous entry with the same account number portion 28, the dynamic data record excluder 24 proceeds to compare the identifier portion 30 stored in the data record index 26 with account number portion 28 to the just generated identifier portion 30 received from the unique data record identification generator 20. If, for example, the identification portion 30 is cycle number, batch number, time, or the like, the dynamic data record excluder will determine that the earlier version of the received data record should be excluded and will generate an indication that a particular account number with a predetermined identifier portion 30 should be excluded from any further processing, and store the account number 28 and identification portion 30 in the exclusion list 34.

The dynamic data record exclusion system 10 will, at a predetermined time and/or under control of one or more users 50a–50c, initiate the data record processor 36 to process one or more data records. Record processor 36 will request one or more data records from record handler 32. Data record handler 32 will retrieve one or more data records from one or more data record tables 44a–44c.

Once the data record is retrieved, data record handler 32 will examiner or search the data record exclusion list 34 for a matching account number portion 28. If the data record handler 32 locates a matching account number portion 28 in the record exclusion list 34, the data record handler will mark the previously retrieved data record as "excluded from processing" and will place the account number 28 and identification portion 30 in the record exclusion list 34.

One exemplary embodiment of the present invention is directed for use with a telephone call processing system such as a UNISON® call processing system available from Davox Corporation of Westford, Mass., which description is incorporated herein by reference. The present invention is also usable with other call record processing systems as well as other data and record processing systems.

Turning now to FIGS. 2–5, a plurality of distributed call centers 60 are shown networked with one another over a computer network 62 which may be a local area network (LAN), wide area network (WAN), global computer network such as an internet connection, intranet connection, or other method of connecting multiple systems together. Each call center 60 interfaces with computer network 62 via at least a data connection 64 and a network interface 68.

Each distributed call center 60 includes, among other systems and components, a computer telephony integration (CTI) system 70, having a dynamic data record exclusion system 10, as described above. The dynamic data record exclusion system 10 includes at least one record exclusion table 40 for storing at least one exclusion record as described previously.

Each distributed call center CTI system 70 includes various CTI system hardware and software components 72, which are well known to those skilled in the art of computer telephony integration, including one or more of a dialer 74, such as a predictive or automated dialer, and an automatic call distributor (ACD) 76, which are configured to interface a plurality of customers using telephone trunk lines 4 with a plurality of CTI system users 50, such as call center agents.

Each distributed call center CTI system 70 also includes an exclusion record propagation system 80 according to the teachings of the present invention. Each exclusion record propagation system 80 includes an exclusion record importer 90 and an exclusion record exporter 100, which interface the dynamic record exclusion system 10 of its corresponding CTI system 70. The exclusion record importer 90 and exclusion exporter 100, in connection with the dynamic data record exclusion system 10, facilitate the transfer of exclusion records generated by the dynamic data record exclusion system 10 between the plurality of distributed call centers 60.

The exclusion record exporter 100 includes a transfer file 102 for receiving and storing at least one exclusion table including at least one exclusion record generated by and to be exported from the dynamic data record exclusion system 10 of one call center CTI system 70. Also included in the exclusion record exporter 100 is a file transfer engine 104, for transferring a transfer file 102 to at least one other distributed call center 60 CTI system.

Each exclusion record importer 90 includes a defined directory 92, for receiving at least one transfer file 102 transferred to the exclusion record importer 90 from at least one exclusion record exporter 100 of another dynamic data record exclusion system 10 of a CTI system 70 associated with a different, networked call center 60. The exclusion record importer 90 also includes an import engine 94 for searching the defined directory 92 to identify if the defined directory includes one or more new transfer files 102.

Figure 4:
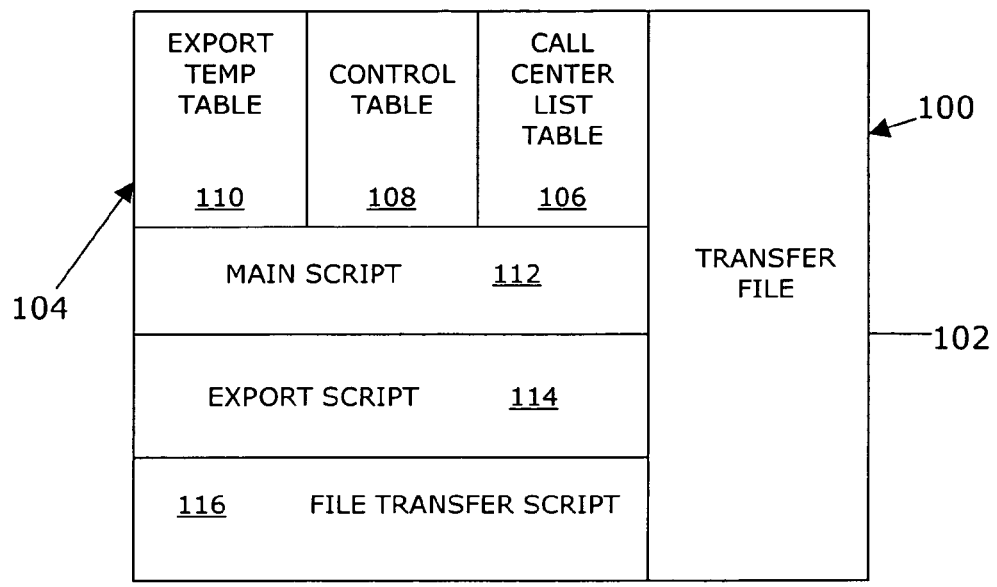
FIG. 4 is a more detailed block diagram showing the components of an exclusion record exporter of the exclusion record propagation system of FIG. 3.
Figure 5:
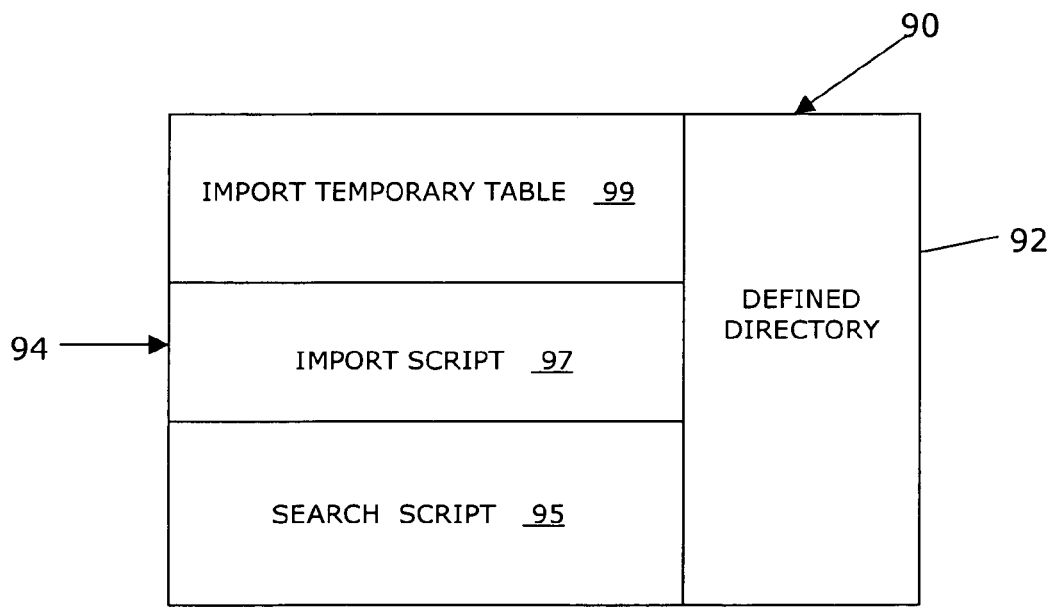
FIG. 5 is a more detailed block diagram showing the components of an exclusion record importer of the exclusion record propagation system of FIG. 3.

In one preferred embodiment of the invention, the exclusion record propagation system is implemented in software using a plurality of tables and scripts. FIGS. 4 and 5 show the tables and scripts associated with one software implementation of the invention. The transfer engine 104 included in the exclusion record exporter 100 (FIG. 4) is comprised of three tables 106–110 and three scripts 112–116.

The first table is a call center list table 106. The call center list table will contain a list of distributed call centers 60 to which exclusion records should be exported by the exclusion record propagation system 80. The second table is a control table 108. The control table 108 contains a list of exclusion tables 40 that should be replicated to the other distributed call centers 60 networked to the first call center over the computer network 62. The control table 108 also includes an indication of a last exclusion record that was exported. The third table is an export temporary table 110. The export temporary table 110 contains at least one exclusion record that should be exported to at least one additional distributed call center 60. A Sybase Query Language (SQL) statement is executed to insert records into the export temporary table 110 from the exclusion table(s) 40 of the dynamic data record exclusion system 10 included in the first call center CTI system 70. Then, a Bulk Copy (BCP) command will be executed to copy the exclusion records included in the export temporary temporary table 110 into the transfer file 102. As will be explained below, the transfer file 102 will then be prepared for transfer to at least one additional distributed call center 60.

The first script included in the software-implemented file transfer engine 104 is a main script 112. The main script 112 uses the control table 108 to run an export script 114 for each exclusion table 40 that should be copied to a transfer file 102. The main script will also run a file transfer script 116, which will copy the files created by the export script 114 to a defined directory in each distributed call center 60 CTI system to which the exclusion records should be exported.

The export script 114 receives, as a parameter, the name of an exclusion table to be exported as well as a record number of the last copied exclusion record. The export script 114 will then clear the export temporary table 110 and insert new exclusion records found in the exclusion table 40 into the export temporary table 110. The export script 114 will then copy the exclusion records from the export temporary table 110 to the transfer file 102 using defined naming standards. In one preferred embodiment, the exclusion records copied from the export temporary table 100 are copied as ASCII files.

In one preferred embodiment, the file transfer script 116 includes an FTP (file transfer protocal) script which will transfer each file in transfer file 102 created by the export script to each of the distributed call centers 60 in the call center list table 106 using file transfer protocol, which is one preferred method of transferring files over a global computer network, such as the Internet. The FTP script will copy the transfer files in a defined directory 92 included in the exclusion record propagation system 80 included in each distributed call center 60 included in the call center list table 106.

The exclusion export process may be initiated at predetermined intervals using, for example, a clock driven signal. In one preferred embodiment of the invention, which is utilized with the dynamic data record exclusion system 10 described above, the exclusion export process will be initiated by adding an entry in the cron program, which will execute the main script 112 at periodic intervals, such as every thirty minutes.

In one preferred embodiment, the import engine 94 included in each exclusion record importer 90 is also implemented using software and comprises a search script 95, an import script 97, and an import temporary table 99. The search script 95 will search for new files containing exclusion records in the defined directory 92 associated with the exclusion record importer 90. Each time the search script 95 identifies a new file containing exclusion records, it will execute the import script 97. The import script 97 receives, as a parameter, the name of the new file found by the search script 95 in the defined directory 92. Each transfer file will include a header record defining an exclusion table to which the exclusion records included in the transfer file should be added. Each exclusion record included in an identified file will be copied from the transfer file to the import temporary table 99. Thereafter, the exclusion records copied to the import temporary table 99 will be copied to the appropriate exclusion table 40 included in the dynamic data record exclusion system 10 at the call center CTI system 70.

Like the exclusion export process, the exclusion import process will, preferably, be performed at periodic intervals, such as every fifteen minutes. When used in conjunction with the dynamic data record exclusion system 10 described above, the initiation of the exclusion import process will be made using an entry in the dynamic data record exclusion system's cron program.

One prefered embodiment of the scripts used for exclusion record export and import are provided in Appendix A.

A method for propagating exclusion records between a plurality of distributed call centers is also provided. Each of the distributed call centers includes a computer telephony integration (CTI) system having a dynamic data record exclusion system as described above. The dynamic data record exclusion system includes at least one exclusion table holding at least one exclusion record to be propagated amongst the plurality of distributed call centers, which are networked over a computer network. The method 200 begins by maintaining at least one exclusion table in a dynamic data record exclusion system at a first of the distributed call centers, step 210. Each exclusion table includes at least one exclusion record. Next, at step 220, at least one exclusion table including at least one exclusion record and a list of distributed call center CTI systems to which the at least one exclusion table should be exported is sent, at specified intervals, to an exclusion record exporter.

Once received at the exclusion record exported, the at least one exclusion table including at least one exclusion record is saved in a transfer file, step 230. Thereafter, the transfer file is transferred to a defined directory at at least one distributed call center CTI system, step 240.

The method of propagating exclusion records also includes the step of searching, using the exclusion record importer, the defined directory in each distributes CTI system to identify is at least one new transfer file has been transferred to the defined directory, step 250.

Finally, said at least one exclusion table including at least one exclusion record stored in an identified new transfer file is copied to an appropriate exclusion table maintained in a dynamic data record exclusion system included in the distributed call center CTI system at each distributed call center to which the exclusion records are desired to be transferred, step 260.

In the preferred embodiment, all of the distributed call centers are networked using a global computer network, such as the Internet. As such, one preferred method for transferring files across the Internet is using file transfer protocol (FTP) accordingly, the transfer of files between the plurality of distributed call center CTI systems is preferably accomplished using FTP.

Accordingly, the disclosed system and method allows exclusion records, which are generated at one of a plurality of distributed call centers including CTI systems to be readily propagated to the remaining call center CTI systems in the remaining plurality of distributed call centers. Therefore, if an exclusion record is generated at a first of the plurality of distributed call centers, the exclusion records will be shared amongst all of the distributed call centers, thus preventing a dialer at any one of the distributed call centers from dialing on a call record that is the subject of an exclusion record generated at any of the distributed call centers.

Modifications and substitutions by one of ordinary skill in the art are considered to be within the scope of the present invention which is not to be limited except by the claims which follow.

APPENDIX A

Exclusion Report

Main Script:

```
Name
    exclude_export_script
Command Line Parameters
    None
Exit Parameters
    0 on Success
    −1 on Failure
Input Files
    None
Input Tables
    Control Table (see Database Table Schema Spec)
Output Files
    None
Output Tables
    None
Temporary Files
    None
Temporary Tables
    None
Other Outputs
    System Messages : The $TRS/bin/logm program will be
used to log actions to System Messages.
```

APPENDIX A-continued

```
Variables
    Tables Array : array of exclusion tables to be
exported
    LastRecNum : integer : holds the value from the
last_copied_num field of the Control Table for the current
exclusion table.
    LastDate : character string : holds the value from
the last_copied_date field of the Control Table for the
current exclusion table.
Process Flow
    Write "Exclusion Export Started" to System Messages
    Read Control Table to get list of exclusion tables
that need to be copied to other dialers. Place the list into
the Tables Array
    For each table in Tables Array
        Fill the LastRecNum and LastDate fields from the
Control Table for the current table.
        Write "Exporting <current table in Tables Array>"
to System Messages
        If a record exists in the table with a RECNUM of
LastRecNum and a date of LastDate then
            Execute the Export Script passing the name of
the current table in the Tables Array and LastRecNum as
parameters
        else
            Execute the Export Script passing the name of
the current table in the tables Array and zero (0) as
parameters
    After all tables have been exported write "Exports
finished, copying to remote dialers" to System Messages
    Run the FTP script.
    Write "Exclusion Export Finished" to System Messages
Export Script:

Name
    exclude_export_table_script
Command Line Parameters
    Exclusion Table Name : character : Name of table in
ccr database to be copied to file.
        Will be of format "exc_<APPLICATION NAME>_<FIELD
NAME>" (e.g. exc_TRACKER_ACCOUNT_NUM)
    LastRecordNumber : integer : stores the record number
of the last record that was copied
Exit Parameters
    0 on Success
    −1 on Failure
Input Files
    ?? : The site ID needs to be read from the system
info file, or where ever else it can be gotten from.
Input Tables
    Exclusion Table Name table : This table will be the
source of the records that will be added to the Export File.
Output Files
    Export File : ASCII : File which contains the newest
exclusion records that were added to the Exclusion Table
specified in the Exclusion Table Name command line parameter.
        Details:
            The       file      will      be     named
exc_<ThisSiteID>_<Exclusion Table Name>_<MMDDHHMM>.txt.
            This     file    will    be    placed    in    the
$RCS/exclude_export directory.
            Header Record of format "-HEADER ApplicationName
FieldName" where the Application Name and Field Name are
extracted from the Exclusion Table Name command line
parameter.
            The values from the FieldName column of the
Exclusion Table Name table will be placed one record per line
in the rest of the file.
Output Tables
    Control Table : The Last Copied Number and Last
Copied Date fields will be updated with the values from the
Record Number field and Date field of the last record to be
placed into the Export File.
Temporary Files
    None
```

APPENDIX A-continued

Temporary Tables
    Exclusion Export Temp Table : netexc_temp : This table will be used to extract the records from the Exclusion Table Name table before copying to the Export File.
  Other Outputs
    System Messages : The $TRS/bin/logm program will be used to log actions to System Messages.
  Variables
    None
  Process Flow
    Clear the temporary table named netexc_temp
    Insert records from <Exclusion Table Name> table with Record Number greater than LastRecordNumber and status not equal to 99 into the temp table.
    Copy the records from the temp table to the Export File.

FTP Script:

Name
  exclude_export_ftp_script
Command Line Parameters:
  None
Exit Parameters
  0 on Success
  −1 on Failure
Input Files
  All files in the $RCS/exclude export directory.
Input Tables
  Dialer Control Table (see Database Schema Spec) : The list of dialers will be used to determine to which dialers the Input Files should be sent.
Output Files
  All Input Files will be copied to other dialers.
Output Tables
  Dialer Control Table : The Last Sent field will be updated with the current date for each dialer that is sent the Input Files.
Temporary Files
  temp_exclude_ftp.scr : ASCII : This file will be rebuilt for each dialer that should receive the Input Files and passed to the FTP program for execution.
Temporary Tables
  None
Other Outputs
  System Messages : The $TRS/bin/logm program will be used to log actions to System Messages.
Variables
  IPAdds array character holds the IP addresses of the remote dialers.
Process Flow
  Add the IP Addresses from the Dialer Control Table to the IPAdds array.
    For each IP Address in the IPAdds array
      Create a new Temporary File
      Add an open statement with the current IP Address from the IPAdds array to the Temporary File
      Add a login id and a password
      Add a statement to turn off prompting
      Add an input statement to put all of the Input Files in the $RCS/exclude_files directory on the remote dialer.
      Add a close statement.
      Run the FTP program passing the name of the temporary file as the script parameter
      Update the Dialer Control Table Last Sent field with the current datefor the current dialer Exclusion Import Search Script:

Name
  down_user_exclusion
Command Line Parameters
  None
Exit Parameters
  0 on Success
  −1 on Failure
Input Files
  All files in the $RCS/exclude_files
Input Tables
  None
Output Files
  Files in $RCS/exclude_files will be copied to down.X.<date> one at a time
Output Tables
  None
Temporary Files
  None
Temporary Tables
  None
Other Outputs
  System Messages : The $TRS/bin/logm program will be used to log actions to System Messages.
Variables
  Files array : character : This array will hold the names of the Input Files.
Process Flow
  Fill the Files array with the names of the Input Files.
    For each file in the Files array
      Get the size of the file
      Wait 15 seconds
      If the file size changes skip this file and try it again after checking the other files.
        If the file size didn't change
          Copy the file to the Output File
          Run the Import Script passing the Output File name as a parameter Import Script:

Name
  down_exclusion_script
Command Line Parameters
  Input File Name : character : This will hold the name of the file that should be imported.
Exit Parameters
  0 on Success
  −1 on Failure
Input Files
  The Input File Name passed as a command line parameter.
  Will have a header formatted like: "-HEADER <APPLICATION NAME><FIELD NAME>"
  Each line after the header will have a value that should be placed in the Field Name field of the Output Table, one per record.
Input Tables
  None
Output Files
  None
Output Tables
  The exclusion table, exc_<APPLICATION NAME>_<FIELD NAME> specified in the header of the Input File.
Temporary Files
  None
Temporary Tables
  tmp_<APPLICATION NAME>_<FIELD NAME> : This will be created from the header of the Input File. See the Database Table Schema Spec for more details.
Other Outputs
  System Messages : The $TRS/bin/logm program will be used to log actions to System Messages.
Variables
  AppName : character : Will store the name of the application determined from the header of the Input File
  FieldName : character : Will store the name of the field determined from the header of the Input File
Process Flow
  Read Header of Input File and place Application Name is AppName and Field Name in FieldName.

APPENDIX A-continued

Create the temporary table.
Copy the data from the Input File into the Temporary Table.
Insert the data from the Temporary Table into the Output Table. Set the status field for inserted records to 99.
Notify the Unison system that the exclusion tables have changed.

What is claimed is:

1. A method of propagating exclusion records between a plurality of distributed call centers, each said call center including a computer telephony integration (CTI) system having a dynamic data record exclusion system, said dynamic data record exclusion system having at least one exclusion table, said plurality of call centers linked over a computer network, said method comprising the steps of:
   maintaining at least one exclusion table in said first call center's dynamic data record exclusion system, said at least one exclusion table for holding at least one exclusion record;
   sending said at least one exclusion table including said at least one exclusion record and a list of distributed call center CTI systems to which said at least one exclusion table should be exported to an exclusion record exporter;
   saving said at least one exclusion table including at least one exclusion record to be exported in a transfer file;
   transferring said transfer file to a defined directory at said at least one distributed call center CTI system;
   searching, using an exclusion record importer, said defined directory to identify if at least one new file has been transferred to said defined directory; and
   copying said at least one exclusion table including at least one exclusion record stored in an identified new transfer file to an appropriate exclusion table maintained in said distributed call center CTI system's dynamic data record exclusion system.

2. A system for propagating exclusion records between a plurality of distributed call centers, each said call center including a computer telephony integration (CTI) system having a dynamic data record exclusion system, said dynamic data record exclusion system having at least one exclusion table, said plurality of call centers linked over a computer network, said system comprising:
   said call center's dynamic data record exclusion system for maintaining at least one exclusion table holding at least one exclusion record;
   an exclusion record exporter for saving said at least one exclusion table including at least one exclusion record to be exported in a transfer file and for sending said at least one exclusion table including said at least one exclusion record and a list of distributed call center CTI systems to which said at least one exclusion table should be exported;
   an exclusion record importer for receiving said transfer file, saving said transfer file to a defined directory at said at least one distributed call center CTI system, and searching said defined directory to identify if at least one new file that has been transferred to said defined directory; and copying said at least one exclusion table including at least one exclusion record stored in an identified new transfer file to an appropriate exclusion table maintained in said distributed call center CTI system's dynamic data record exclusion system.

3. The system of claim 2, wherein said exclusion record exporter includes a transfer file for receiving and storing at least one exclusion table including at least one exclusion record from said dynamic data record exclusion system.

4. The system of claim 3, wherein said exclusion record exporter further includes a file transfer engine for transferring said transfer file to at least one distributed call center CTI system.

5. The system of claim 4, wherein said file transfer engine comprises a file transfer script.

6. The system of claim 5, wherein said computer network comprises a global computer network (Internet) and said file transfer script comprises a file transfer protocol (FTP) script.

7. The system of claim 4, wherein said exclusion record importer includes a defined directory for receiving at least one transfer file transferred to said exclusion record importer from at least one exclusion record exporter of another dynamic data record exclusion system.

8. The system of claim 7, wherein said exclusion record importer further comprises an import engine for searching said defined directory to identify if said defined directory includes at least one new transfer file.

9. The system of claim 5, wherein said file transfer engine further comprises an export temporary table, a control table, a call center list table, a main script, and an export script.

10. The system of claim 8, wherein said import engine comprises a search script, an import script, and an import temporary table.

11. The system of claim 9, wherein said call center list table comprises an address field for holding an address of a call center to which at least one exclusion record should be sent and a date/time field for holding a date and time that a last exclusion table was sent.

12. The system of claim 9, wherein said control table comprises: a name field for holding a name of an exclusion table that should be exported to said plurality of distributed call centers; a record number field for holding a record number for a last exclusion record that was exported to said plurality of distributed call centers; and a date/time field for holding a date and time for that said last exclusion record that was exported to said plurality of networked CTI systems.

13. The system of claim 9, wherein said export temporary table comprises: a record number field for holding at least one record number for an exclusion record to be exported received from said exclusion table; a date/time field for holding a date and time that said at least one exclusion record was added to said exclusion table; and an exclusion data field for holding exclusion date for each exclusion record received from said exclusion table.

14. The system of claim 13, wherein said import temporary table comprises: a record number field for holding at least one record number for an exclusion record to be imported from at least one of said plurality of networked call centers; a date/time field for holding a date and time that said at least one exclusion record was added to said exclusion table; and an exclusion data field for holding exclusion date for each imported exclusion record.

* * * * *